United States Patent [19]
Hornsey et al.

[11] Patent Number: 5,688,367
[45] Date of Patent: Nov. 18, 1997

[54] METHOD OF MONITORING AND RECOVERING OXYGEN-RICH GAS FROM OZONE BLEACHING

[75] Inventors: Derek Hornsey, Beaconsfield; Gordon H. Homer, West Vancouver; John R. Ayton, Delta, all of Canada

[73] Assignee: Canadian Liquid Air/Air Liquide Canada LTEE, Canada

[21] Appl. No.: 570,369

[22] Filed: Dec. 11, 1995

Related U.S. Application Data

[63] Continuation of Ser. No. 121,381, Sep. 13, 1993, abandoned.

[30] Foreign Application Priority Data

Sep. 15, 1992 [CA] Canada ................................ 2078276

[51] Int. Cl.$^6$ ................................ D21C 9/147; D21C 9/153; D21C 11/06
[52] U.S. Cl. ................................ 162/38; 162/40; 162/49; 162/62; 162/65
[58] Field of Search ................................ 162/40, 49, 57, 162/62, 65, 38, 78

[56] References Cited

U.S. PATENT DOCUMENTS

| | | | |
|---|---|---|---|
| 3,668,063 | 6/1972 | Engstrom | 162/65 |
| 5,087,326 | 2/1992 | Jones | 162/65 |
| 5,296,097 | 3/1994 | Friend | 162/65 |
| 5,296,099 | 3/1994 | Griggs et al. | 162/65 |
| 5,411,633 | 5/1995 | Phillips et al. | 162/65 |

FOREIGN PATENT DOCUMENTS

| | | | |
|---|---|---|---|
| 644712 | 11/1992 | Australia | 162/65 |
| 0 397 308 | 11/1990 | European Pat. Off. | 162/65 |
| 0 426 652 | 5/1991 | European Pat. Off. | |
| 0 557 112 | 8/1993 | European Pat. Off. | |
| WO 93/00470 | 1/1993 | WIPO | |

OTHER PUBLICATIONS

Henricson et al, "New Generation Kraft Pulping and Bleaching Technology", Ahlstrom, Apr. 1992.

Bleaching: A Tappi Press Anthology, vol. 2, 1993, pp. 110–117, Norman Liebergott, et al., "A Survey of the Use of Ozone in Bleaching Pulps, Part 2".

Bleaching: A Tappi Press Anthology, vol. 2, 1993, pp. 197–209, T. Laxen, et al., "Medium Consistency Ozone Bleaching".

Abstracts Bulletin of the Institute of Paper Chemistry, vol. 43, No. 6, p. 608, 1972, AN-6227.

Primary Examiner—Steven Alvo
Attorney, Agent, or Firm—Jeffrey L. Wendt

[57] ABSTRACT

A method and installation for bleaching a lignocellulosic pulp with ozone, while recovering an oxygen-rich gas which may be recycled or re-used. Bleaching of the pulp with ozone is preferably carried out under conditions in which ingress of air is prevented. In a multi-step bleaching process, an oxygen-rich vent gas typically containing at least 90%, by weight, of oxygen may be recovered from a second contactor for potential use in different oxygen-consuming operations in a pulp mill.

15 Claims, 2 Drawing Sheets

METHOD OF MONITORING AND RECOVERING OXYGEN-RICH GAS FROM OZONE BLEACHING

This is a continuation of application Ser. No. 08/121,381 filed on Sep. 13, 1993, and now abandoned.

FIELD OF THE INVENTION

This invention relates to a method and installation for bleaching a lignocellulosic pulp with ozone, with recovery of an oxygen-rich gas.

BACKGROUND OF THE INVENTION

Wood contains two main components, a fibrous carbohydrate, which is a cellulosic portion, and a non-fibrous component. The polymeric chains forming the fibrous cellulose portion of the wood are aligned with one another and form strong associated bonds with adjacent chains. The non-fibrous portion of the wood comprises a three-dimensional polymeric material known as lignin. The lignin bonds the cellulosic fibers, and is also distributed within the fibers themselves. For use in paper-making processes the wood is converted to pulp.

Pulp comprises wood fibers capable of being slurried or suspended and then deposited upon a screen to form a sheet of paper. The methods employed to accomplish the pulping step involve physical or chemical treatment of the wood, or a combination of these two treatments, to alter the chemical form of the wood and to impart desired properties to the resulting product.

There are two main types of pulping techniques: mechanical pulping and chemical pulping. In mechanical pulping, the wood is physically separated into individual fibers; in chemical pulping, the wood chips are digested with chemical solutions to solubilize a portion of the lignin and thus permit its removal. The commonly utilized chemical pulping processes are broadly classified as (a) the soda process, (b) the sulfite process, and (c) the Kraft process. The Kraft process is the most commonly used.

The soda process employs sodium hydroxide as the active reagent to break down the lignin and to assist in its removal. The sulfite process is described in the Handbook for Pulp & Paper Technologists—Chapter 6: Sulfite Pulping (TAPPI, U.S.A.).

The Kraft process, together with its numerous variations, is the principal chemical process utilized in paper manufacturing. The basic Kraft process, as described in the Handbook for Pulp and Paper Technologists—Chapter 7: Kraft Pulping (TAPPI, U.S.A.), involves digesting the wood chips in an aqueous solution of sodium hydroxide and sodium sulfide. This process is highly effective in pulping. The Kraft process produces a relatively high-strength pulp since its use entails diminished attack on the cellulose component of the wood.

The modified Kraft techniques result in even less degradation of the polymeric structure of the cellulosic fibers during pulping, and, consequently, strength loss in the resultant paper product is diminished as compared to that occurring with the standard Kraft process.

One such modified Kraft pulping process is "extended delignification", which encompasses a variety of modified Kraft techniques, such as adding the pulping chemicals in a specific defined sequence, or at different locations within the digester apparatus, or at different time periods, or with a removal and reinjection of cooling liquors in a prescribed sequence, so as to more effectively remove a greater amount of lignin while reducing the severity of the pulping liquor's chemical attack on the cellulosic fibers. Another modification of the Kraft process is the Kraft-AQ process, wherein a small amount of anthraquinone is added to the Kraft pulping liquor to accelerate delignification while limiting the attack upon the cellulosic fibers which comprise the wood.

A variety of other extended delignification techniques are known and include Kamyr Modified Continuous Cooking as described by V. A. Kortelainen and E. A. Backlund in TAPPI, vol. 68 (ii), 70 (1985); Beloit Rapid Displacement Heating as reported by R. S. Grant in TAPPI, vol. 66 (3), 120 (1983); and Sunds Cold Blow Cooking as reported by B. Pettersson and B. Ernerfeldt in Pulp and Paper, vol. 59 (11), 90 (1985).

Digestion of the wood in the Kraft or a modified Kraft process produces a brownstock, which is a dark colored slurry of cellulose fibers. The dark color of the brownstock is attributable to the presence of residual lignin not removed during digestion and which has been chemically modified in pulping to form chromophoric groups. In order to lighten the color of the brownstock pulp, so as to make it suitable for white paper manufacture, it is necessary to remove the residual lignin by use of delignifying materials and by chemically converting any residual lignin into colorless compounds by bleaching or brightening.

Prior to bleaching the pulp, the digested material is conventionally transferred to a separate blow tank after the chemical treatments involved in the pulping process are completed. Within the blow tank, the pressure developed during the initial chemical treatment of the lignocellulosic material is relieved, and the pulp material is separated into a fibrous mass. The resulting fibrous mass is then subjected to a series of washing steps to remove residual chemicals and the soluble materials, such as the lignin, which were separated from the fibrous materials in the pulping process. Frequently, the pulp also undergoes one or more screening steps designed to separate out the larger portions of undefibered wood for special processing, for example recooking or mechanical grinding.

The black liquor residue obtained from the washing process is collected, concentrated, and is typically incinerated in an environmentally safe manner in a recovery boiler.

The delignification and bleaching processes are conducted on the washed fibrous mass in a series of steps, using selected combinations of chemical reactants. In the prior art, various combinations of chemical treatments have been suggested. Furthermore, individual treatment steps have been rearranged in an almost limitless number of combinations and permutations. Therefore, in order to simplify the explanation of the various bleaching processes and systems, the use of letter codes is conventionally employed in combination to describe the particular chemical reactants employed and the sequence of the steps of the process.

The letter codes conventionally employed are as follows:

| | |
|---|---|
| C = Chlorination | Reaction with elemental chlorine in acidic medium. |
| E = Alkaline Extraction | Dissolution of reaction products with NaOH. |
| $E_o$ = Oxidative Alkaline Extraction | Dissolution of reaction products with NaOH and oxygen. |
| D = Chlorine Dioxide | Reaction with $ClO_2$ in acidic medium. |

-continued

| | |
|---|---|
| P = Peroxide | Reaction with peroxides in alkaline medium. |
| O = Oxygen | Reaction with elemental oxygen in alkaline medium. |
| Z = Ozone | Reaction with ozone. |
| C/D = | Admixtures of chlorine and chlorine dioxide. |
| H = Hypochlorite | Reaction with hypochlorite in an alkaline solution. |

Conventionally, delignification and bleaching of wood pulp has been carried out with elemental chlorine.

Although elemental chlorine is a very effective bleaching agent, the effluents from chlorine bleaching processes contain large amounts of chlorides produced as the by-product of these processes. These chlorides readily corrode processing equipment, thus requiring use of costly materials in the construction of such mills. Further, the build-up of chlorides within the mill precludes recycling the washer filtrate after a chlorination stage in a closed system operation without employing recovery systems requiring extensive, and therefore expensive, modifications. In addition, concern about the potential environmental effects of chlorinated organics in effluents, which some authorities believe to be toxic to humans and animals, has caused significant changes in government requirements and permits for bleach mills which include standards that may be impossible to meet with conventional chlorine bleaching technology.

To avoid these disadvantages, the paper industry has attempted to reduce or eliminate the use of elemental chlorine and chlorine-containing compounds from multistage bleaching processes for lignocellulosic pulps. Complicating these efforts is the requirement of high levels of pulp brightness for many of the applications for which such pulp is to be used.

In this connection, efforts have been made to develop a bleaching process in which chlorine-containing agents are replaced, for example, by oxygen for the purpose of bleaching the pulp. The use of oxygen does permit the recycling of effluent from this stage for recovery and does permit a substantial reduction in the amount of elemental chlorine used.

The use of oxygen, however, is often not a completely satisfactory solution to the problems encountered with elemental chlorine. Oxygen is not as selective a delignification agent as elemental chlorine, and the Kappa number of the pulp, using conventional oxygen delignification methods, can be reduced only a limited amount before there is an unacceptable attack on the cellulosic fibers. Also, after oxygen delignification, the remaining lignin has heretofore typically been removed by chlorine bleaching methods to obtain a fully-bleached pulp. Although such a process uses reduced amounts of chlorine, concerns associated with the use of chlorine still persist.

To eliminate the need for chlorine bleaching agents, the removal of such remaining lignin with the use of ozone in the bleaching of chemical pulp has previously been attempted. Although ozone may initially appear to be an ideal material for bleaching lignocellulosic materials, the highly oxidative properties of ozone and its relative high cost have heretofore limited the development of satisfactory ozone bleaching processes for lignocellulosic materials.

Since the delignifying capabilities of ozone were first recognized, there has been substantial and continuous work by numerous persons in the field to develop a commercially suitable method using ozone in the bleaching of lignocellulosic materials.

The bleaching of pulp using ozone has been studied and reported during the last two decades by Singh, R. P. et al., Advances in Ozone Bleaching Part 2. Bleaching of softwood Kraft pulps with oxygen and ozone combination TAPPI oxygen, Delignification Symposium, San Francisco, Calif., 1984, Liebergott, N., Bleach Plant of the year 2000. TAPPI Pulping Conference, Hollywood, Fla., 1985, and Soteland, N., Bleaching of Chemical Pulps with Oxygen and Ozone, Pulp and Paper Mag. Can. 75 (1974).

The initial studies were carried out under laboratory conditions on either high consistency or low consistency pulp slurries because it was easier to contact the gas with the pulp under these conditions.

More recently, laboratory studies have been carried out on medium consistency ozone bleaching by Laxen, T. et al, Medium consistency ozone bleaching, Paperi Ja, Peru 72 (1190: 5), and pilot scale operations are currently underway or being operated at Lenzing AG in Austria, Peter, W. et al, Experience with Medium Consistency—Ozone Bleaching Prototype in the Mill, Non-Chlorine Bleaching Proceedings, March 1992, Hilton, Head, S.C.

Union Camp Patent Specification WO 91/18145, published Nov. 28, 1991, describes processes for delignifying and bleaching lignocellulosic pulp without the use of elemental chlorine, in which a high consistency pulp is partially delignified to a Kappa No. typically of up to 10 and a viscosity typically of more than 13 cps, for example, with oxygen, whereafter delignification is completed with ozone to a Kappa No. typically of up to 5 and a viscosity typically of more than about 10 cps. The ozone delignification is carried out under conditions in which the Ph, temperature and consistency of the pulp, as well as the pulp particle size and density, are controlled to facilitate penetration of a majority of the pulp particles by ozone, with substantially uniform delignification and bleaching throughout a majority of the particles to form a bleached pulp.

These studies have produced a body of knowledge concerning the effects of ozone on the bleaching of pulp and how the properties of the pulp are affected. However, there exists a need for a commercially advantageous scheme for using and recovering vent gases resulting from contacting an ozone-oxygen mixture with a pulp slurry.

SUMMARY OF THE INVENTION

It is known that to make ozone treatment of pulp effective, at least about five kilograms of ozone per ton of pulp is necessary. However, available medium consistency mixers can only accommodate up to about 35 percent gas volume.

In order to increase the effective ozone concentration in the mixing stage, certain embodiments of the present invention include the elevation of pressure in the ozone/oxygen mixture to increase the ozone concentration therein for use in the process of the present invention.

In accordance with the present invention, it has been found that bleaching of pulp with a gas comprising a mixture of ozone and oxygen can be carried out with production of an oxygen-rich vent gas which can then be employed in different operations having an oxygen requirement.

Thus, the oxygen-rich gas can be recycled back to an ozone generator to generate a fresh mixture of ozone and oxygen for further pulp bleaching. Alternatively, depending on ultimate vent gas quality, it can be used in waste water treatment or in different operations carried out in a pulp mill, for example in oxygen delignification, white liquor oxidation, black liquor oxidation, lime kiln enrichment, lime mud oxidation, generation of polysulfides from white liquor or oxygen extraction processes.

Significantly, it has been found that treating lignocellulosic pulp with an ozone mixture in a plurality of mixing units results in a commercial process having many advantages. It has been determined that vent gas from ozone mixing units downstream of a first ozone mixing unit is a superior quality gas relative to vent gas from the initial ozone mixer, and also superior to those vent gas mixtures resulting from pulp bleaching processes prior to the present invention.

Among other factors, and without limiting the present invention to any particular theory of operation, it is believed the advantages obtained are due, in part, to a sparging effect which occurs in the initial ozone mixing unit. Additionally, with a plurality of mixing units, deaeration of entrained air in the pulp and degassing of carbon dioxide produced in prior acidification steps take place in the initial ozone contactor, prior to downstream ozone contacting steps.

Thus, in the multiple stage embodiments, the vent gas from the initial ozone mixer is usable in other mill processes such as for example delignification, $E_o$, and lime kiln processes. In accordance with the present invention, vent gas from the second and other downstream ozone mixing units may be recycled back to the bleaching process itself, with very little treatment required prior to reuse. Gas quality from the second and other downstream mixing units is sufficiently high that it is only preferable to subject the gas to be recycled to an ozone destruct unit and also preferably to a dryer before recycle to the ozone generator for re-use in the bleaching process. The simplicity of recycle steps with the present invention is of much advantage in commercial application.

Accordingly, in a preferred embodiment of the present invention, a lignocellulosic pulp is bleached in a process comprising the steps of: generating ozone from a feed gas comprising oxygen; contacting at least a portion of the lignocellulosic pulp with a mixture comprising oxygen and ozone in a first contactor to produce a treated pulp and an effluent gas; contacting at least a portion of the treated pulp with a mixture comprising oxygen and ozone in a second contactor; recovering a bleached pulp, and; recovering an oxygen-rich gas having an impurity concentration sufficiently low to allow re-use of the recovered oxygen-rich gas. Among other factors, recycle of the effluent gas from the second contactor is made possible in accordance with the present invention by the treatment of the pulp in a first contactor with a mixture comprising oxygen and ozone.

The vent gas from one or both ozone contactors may be monitored for flow and oxygen content, and flow and quality of the oxygen and ozone-containing feed mixture may be adjusted according to requirements for vent gas re-use. In this manner of control, beneficial results may be maximized.

Additional embodiments of the above invention include the contacting of the pulp with a quantity of oxygen-containing liquid, preferably hydrogen peroxide, prior to contacting the pulp with an ozone and oxygen mixture in a second contactor, or including the $O_2$-containing liquid in one of both of the contactors themselves. Recycled pulps have appeared to benefit from hydrogen peroxide addition.

Another embodiment of the present invention further provides a process for the production of an oxygen enriched gas for feed to the ozone generator, which gas has an $O_2$ content of less than about 95%, most preferably about 93%, and is produced in an adsorption unit. When the pulp is treated in a first contactor with an ozone mixture, further bleaching with ozone in a second contactor has been found to produce a recoverable gas having a substantially high enough $O_2$ level to enable its commercially valuable use in oxygen bleaching and in other processes.

In accordance with this aspect of the process of the present invention, ozone is generated from a gas mixture preferably produced in a vacuum swing adsorption unit and having a reduced oxygen purity, to produce an oxygen/ozone mixture. A portion of the oxygen/ozone mixture is contacted with lignocellulosic pulp in a first contactor, and at least a portion of the treated pulp then contacted with another portion of the oxygen/ozone mixture in a second contactor. The oxygen content in the vent gas recovered from the second contactor is typically greater than about 85%, preferably about 90% oxygen, thus enabling the use of the recovered gas mixture from the second contactor in other application such as for example oxygen delignification, oxygen reinforced alkaline extraction, white liquor oxidation, lime kiln enrichment, and polysulfide generation.

In order to maximize the oxygen content in the recovered vent gas from downstream bleaching units, it may be advantageous to provide for deaeration of the pulp, or to adjust the ozone to pulp ratio between the plurality of bleaching units, as further described below.

In accordance with another aspect of the invention, there is provided a method of bleaching a lignocellulosic pulp with ozone, with recovery of an oxygen-rich gas comprising:

(a) providing a washed, aqueous cellulosic pulp comprising cellulosic material dispersed in an aqueous vehicle, (b) mixing said aqueous pulp with ozone-containing oxygen to disperse the ozone in the aqueous vehicle, (c) maintaining contact between the dispersed ozone and the cellulosic material for a time sufficient to permit bleaching of said cellulosic material by said ozone, with liberation of by-product oxygen from said ozone, (d) recovering a bleached pulp, and (e) recovering an oxygen-rich gas, said steps of mixing (b) and maintaining contact (c) being carried out under a condition such that ingress of air is substantially prevented.

In particular, the oxygen-rich gas recovered in (e) may be fed to an oxygen consuming process either directly, possibly after pretreatment steps, or after storage.

In accordance with another aspect of the invention, there is provided an installation for bleaching cellulosic pulp with ozone, with recovery of an oxygen-rich gas comprising:

(a) an ozone generator for generating a supply of ozone-containing oxygen, (b) a pulp mixer having means to disperse gas in an aqueous pulp, (c) a first conduit for delivery under pressure of an ozone-containing oxygen to said pulp mixer, from said ozone generator, (d) a retention housing communicating with said pulp mixer, and adapted to receive aqueous pulp containing dispersed ozone from said pulp mixer, said retention housing providing a flow path for the aqueous pulp sufficient to provide a contact time for bleaching of the dispersed pulp by the dispersed ozone, with liberation of by-product oxygen from said ozone, (e) vent means for removal of vent gases from said retention housing, said vent gases comprising oxygen from said ozone-containing oxygen, and liberated by-product oxygen, (f) a gas recovery line communicating with said vent means for recovery of an oxygen-rich gas, and (g) a recovery line for flow of bleached pulp from said retention housing, said pulp mixer and said retention housing being sealed against ingress of air.

BRIEF DESCRIPTION OF THE DRAWINGS

The invention is illustrated in particular and preferred embodiments by reference to the accompanying drawings, in which.

DETAILED DESCRIPTION OF PREFERRED EMBODIMENTS i) Pulp Type

The above embodiments of the present invention can be employed with different lignocellulosic pulps including chemical Kraft pulp, which has been subjected to oxygen delignification, chemical sulfite pulps, chemithermomechanical pulps and pulps of recycled fibers or reslushed waste paper or paperboard, or mixtures thereof.

The pulp may be a medium consistency pulp, by which is to be understood a pulp having a solids concentration in water of about 8 to 12%, typically about 10%, by weight; a high consistency pulp, by which is to be understood a pulp having a solids concentration in water of about 20 to 40%, by weight; or a low consistency pulp, by which is to be understood a pulp having a solids concentration in water of about 0.5 to 3%, by weight.

The invention may also be employed with pulps having a concentration or consistency intermediate those indicated above. However, for the concentrations indicated above, equipment is readily available for production and handling or pumping the pulps.

Thus, low consistency pulps may be pumped by an ordinary centrifugal pump, and the pulps can be obtained without press rolls, using deckers and filters. Medium consistency pulps require special pumps which are available, and high consistency pulps are obtained by use of presses.

The pulps which may be processed in accordance with the present invention comprise cellulosic material dispersed in an aqueous vehicle.

In the case of Kraft pulp and chemical sulfite pulp, the pulp stock is suitably subjected to an oxygen delignification followed by washing, prior to bleaching with ozone. The washing removes solubilized lignin so that the Kappa number for oxygen delignified hardwood pulp is in the range 5–15, especially 9–11, and for oxygen delignified softwood pulp is in the range 7–16, preferably 11–13. The pulp may also comprise a mixture of hardwood and softwood, especially in the case of recycled fiber pulp.

In order to achieve these Kappa levels, efficient washing of the delignified pulp is necessary, and in order to achieve this, two stage washing may be necessary.

The washed pulp is suitably acidified to a Ph of 1 to 5, preferably 2 to 4, whereafter the acidified pulp is subjected to bleaching with ozone. Suitable acids include sulphuric acid and oxalic acid.

ii) Ozone Bleaching

The ozone is suitably generated at the site of the pulp mill in an ozone generator, so that freshly generated ozone is delivered directly to the ozone bleaching section of the mill.

The ozone is preferably generated from dry, high purity oxygen employing known procedures. In particular, the oxygen preferably has a dryness determined as a dewpoint of less than −70° C. and is preferably substantially free of other gases, such as carbon dioxide, carbon monoxide and gaseous hydrocarbons. However, oxygen from a more economical source, such as a vacuum swing adsorption unit, may be used.

The ozone generator typically generates ozone from oxygen to produce an ozone-containing oxygen which comprises 1 to 20%, preferably 5 to 15%, preferably about 6 to 10%, by weight, ozone, with the balance being oxygen and residual amounts of nitrogen and argon.

The bleaching with ozone is conducted in one or more bleaching units to which the ozone-containing oxygen is fed at a pressure of about 5 to 20, preferably 9 to 15, preferably about 12 atmospheres absolute. Each bleaching unit includes a pulp mixer and a retention tube.

The gas mixture comprising $O_2/O_3$ and the aqueous pulp are both fed to a pulp mixer of a bleaching unit. Ozone is dispersed in the aqueous vehicle of the pulp by agitation in the pulp mixer, and, in particular, is dispersed as a plurality of fine bubbles or small voids which represent coalesced groups of fine bubbles. The gas pressure is selected to ensure that a plurality of discrete fine bubbles or small voids of ozone is dispersed in the aqueous vehicle; in this way the contact area between the ozone bubbles or voids and the cellulosic material is maximized.

If the pressure is too high, the voids become large, and the contact area between the ozone and the cellulosic material is reduced, so that ozone is not consumed and bleaching efficiency is lowered.

After dispersion of the ozone in the aqueous pulp, the pulp is fed into the retention tube which provides a flow path for the flowing pulp sufficient to provide a contact or exposure time between the dispersed ozone and the cellulosic material to consume the ozone in the bleaching of the pulp, with liberation of oxygen.

Suitably, the flow of pulp and the length of the retention tube are correlated to provide a contact time depending on the charge of ozone. For example, a charge of 3 kg of ozone/ton of pulp typically will require a contact time of the order of 60 seconds, which may be achieved by use of a retention tube having a length of 10 ft. and a flow rate of aqueous pulp in the tube of 10 ft./min. A higher charge of ozone will require a larger contact time, thus a 5 kg/ton charge of ozone may require about 120 seconds. This is to allow adequate time for reaction and thereby achieve efficient use of the ozone.

In the case in which a plurality of bleaching units is employed, the bleached aqueous pulp from a first upstream bleaching unit flows from the retention tube of that first unit to the pulp mixer of an adjacent downstream bleaching unit; ozone-containing oxygen is fed to the pulp mixer of such downstream bleaching unit, and thereafter bleaching is effected in the same manner as described above.

The variation in application rates of gases in the mixing stages is a function of the desired ozone application rate, the purities and gas volumes required for other mill processes to which vent gases are transported, and recycle requirement of vent gas to the bleaching units in accordance with the present invention.

It is preferred, when employing a plurality of bleaching units, to maintain the ratio of ozone to pulp in the first stage at a predetermined level which is less than the ratio of ozone to pulp in the second contactor. Preferably, the ratio in the first contactor is between about thirty percent and about seventy percent of the ratio of ozone to pulp in the second contactor. Most preferably, the ratio in the first stage is about one-half of the ratio in the second stage to most advantageously recover an oxygen-rich gas which is low enough in contamination to be re-usable in other processes.

In another embodiment and in accordance with the present invention, it is possible to use a produced oxygen having a lower purity for generating ozone to feed the bleaching units. The produced oxygen in this embodiment is preferably from a pressure or vacuum swing adsorption unit, although it may be from any source. Because gas impurities in the pulp are purged with the vent gas from the first stage contactor in the bleaching process, the resulting oxygen concentration of the effluent oxygen-containing gas from the downstream bleaching units will typically be higher than the purity of the upstream vent gas. This aspect is another advantage of the process.

In another embodiment of the present invention, an oxygen-containing liquid, preferably hydrogen peroxide, is contacted with the pulp at least prior to the contacting of the pulp with the ozone in the second contactor. The aqueous mixture in the second contactor may optionally also contain an oxygen-containing liquid such as hydrogen peroxide.

In each of the above embodiments of the process of the present invention, the bleaching units are preferably gas-tightly sealed to prevent ingress of air into the units and escape of ozone from the units.

iii) Vent Gases

Each of the bleaching units has a vent means for removal of vent gases developed during the bleaching in the retention tube.

Preferably the vent is suitably sealed to prevent ingress of air or escape of vent gases and may operate under pressure or vacuum. The vent gases comprise oxygen from the ozone-containing oxygen employed in the bleaching as well as by-product oxygen formed from the ozone during bleaching.

The vent gases further may contain unused ozone as well as air, carbon dioxide, carbon monoxide and gaseous hydrocarbon; although as described above, the content of these latter gases is dependent on their content in the aqueous pulp entering the bleaching unit. Vent gases from bleaching units downstream of the first contacting with ozone/oxygen mixture, when the process is practiced in accordance with the present invention, will be sufficiently pure to allow recycle of the vent gas.

Oxygen delignification of pulp is carried out under highly alkaline conditions, employing caustic soda, at a temperature of about 100° C., a pressure of about 100 psig and a resident time of about one hour, resulting in the formation of carbon dioxide and carbon monoxide. The carbon dioxide is absorbed in the caustic soda and forms sodium carbonate, and some of the carbon monoxide dissolves.

When the pulp is washed, most of the sodium carbonate is removed, but some remains in the pulp. Thus, when the pulp is acidified prior to the ozone bleaching, carbon dioxide is liberated by decomposition of the sodium carbonate, and some of this remains in solution along with dissolved carbon monoxide. When this acidified pulp is mixed in a high shear mixer with an ozone-containing oxygen, the carbon dioxide and carbon monoxide gases are stripped from solution, and are then present in the vent gases that leave the pulp after the ozone has reacted. The liberation of these undesirable gases is particularly the case in the initial bleaching unit.

Air may also be entrained by the pulp in the course of oxygen delignification or subsequent washing. This air is stripped out along with carbon dioxide and carbon monoxide and is the source of argon and nitrogen in the vent gas.

It is possible to remove at least some of the carbon dioxide and air by passing the pulp slurry through a vacuum degassing device or through use of a pump prior to the bleaching units. This will remove air along with some carbon dioxide and hydrocarbons. A pump equipped with vacuum degassing can, for example, reduce the air content of a pulp from 10–20% down to 3–5%, by volume, at ambient temperature and pressure.

It has also been found that the concentration of ozone in the vent gases depends on process conditions of the pulp, for instance the type of pulp (softwood or hardwood), the quantity of ozone added, and the pressure at which the addition and mixing are carried out. The effectiveness of the mixer and residence time of the gas in contact with the pulp will also have an effect, as will the COD of the aqueous pulp.

In one example, it was found that if 6% W/W concentration of ozone in oxygen was mixed with hardwood pulp at a pressure of about 150 psig for a gas-pulp contact time of about 60 seconds, and the ozone charge was 0.3% on pulp, about 99% of the ozone was absorbed and the residual ozone was 0.1% W/W or less. When this was passed through an ozone destruction unit, the ozone concentration was reduced to 0.001 ppm ozone.

In another example, 6% ozone W/W concentration in oxygen was dispersed in a medium consistency hardwood pulp at a pressure of about 150 psig for a residence time of about 60 seconds and an ozone charge of 0.6% on pulp. Not all of the ozone was consumed, and the residual ozone was found to be 1.8% W/W. When the vent gas passed through the ozone destruction unit, the ozone was reduced to a concentration of 0.001 ppm.

The total hydrocarbon concentration is found generally to be less than 80 ppm. This can be reduced to zero by passing the vent gas mixture containing oxygen across a heated catalyst. The oxygen present, along with the catalyst, will oxidize the hydrocarbons to $CO_2$. The $CO_2$ can be removed from the vent gases by absorption on a molecular sieve.

If all of these steps are followed, a gas of high concentration in oxygen can be produced as shown for an ozone charge of 0.3% in Table I and an ozone charge of 0.6% in Table II.

| Process conditions for 0.3% ozone charge on medium consistency pulp | |
|---|---|
| Ozone concentration | 6% w/w in $O_2$ gas |
| Pressure at Pulp/Gas Mixer | 150 psig |
| Temperature Pulp | 35° C. |
| Consistency | 8–12% |
| Type Pulp | Hardwood |
| Ph | 2–4 |

TABLE I

Vent gas composition at different Process Steps

| Process Steps | Gas Composition | | | | |
|---|---|---|---|---|---|
| | $O_2$ % V/V | Ar + $N_2$ % V/V | $CO_2$ % V/V | H/C ppm | $O_3$ % |
| Without degassing | 89.3 | 8.6 | 2.0 | 35 | 0.1% W/W |
| With degassing | 94.2 | 4.6 | 1.1 | 35 | 0.1% W/W |
| After $O_3$ Destruct | 94.2 | 4.6 | 1.1 | 35 | 0.001 ppm |
| After removal Hydrocarbon | 94.2 | 4.6 | 1.1 | 0 | 0.001 ppm |
| After removal $CO_2$ | 95.3 | 4.7 | 0 | 0 | 0.001 ppm |

If the ozone charge is doubled to 0.6% on pulp, the vent gas composition is as shown in Table II.

Process conditions for 0.3% ozone charge on medium consistency pulp

| | |
|---|---|
| Ozone concentration | 6% w/w in $O_2$ gas |
| Pressure at Pulp/Gas Mixer | 150 psig |
| Temperature Pulp | 35° C. |
| Consistency | 8–12% |
| Type Pulp | Hardwood |
| Ph | 2–4 |

TABLE II

Vent gas composition at different Process Steps

| | Gas Composition | | | | |
|---|---|---|---|---|---|
| Process Steps | $O_2$ % V/V | Ar + $N_2$ % V/V | $CO_2$ % V/V | H/C ppm | $O_3$ % |
| Without degassing | 91.1 | 4.5 | 1.8 | 45 | 0.6% W/W |
| With degassing | 96.9 | 1.0 | 0.4 | 45 | 1.7% W/W |
| After $O_3$ Destruct | 98.6 | 1.0 | 0.4 | 45 | 0.001 ppm |
| After removal Hydrocarbon | 98.6 | 1.0 | 0.4 | 0 | 0.001 ppm |
| After removal $CO_2$ | 98.8 | 1.0 | 0 | 0 | 0.001 ppm |

It can be seen from Tables I and II that the vent gases contain a high concentration of oxygen, some argon and nitrogen, carbon dioxide, small concentrations of hydrocarbons and some ozone residual; employing ozone destruction and procedures for removal of hydrocarbons and carbon dioxide provides an oxygen-rich vent gas which can be employed in processes which have an oxygen requirement.

Thus, the oxygen-rich vent gas can be employed in such processes as:

oxygen delignification,
white liquor oxidation,
black liquor oxidation,
polysulfide formation from white liquor,
lime kiln air enrichment,
oxygen extraction processes,
lime mud oxidation,
ozone generation.

For some of these processes the presence of residual amounts of other gases, for example nitrogen or carbon monoxide, is not a critical factor, and, therefore, post treatments for removal of other gases can be selected with regard to the intended use of the oxygen. In the case where the oxygen is employed for ozone generation, other gases should be minimized, and the oxygen should be dried to remove water.

Likewise, for some processes the presence of residual amounts of ozone is not a critical factor, and the oxygen gas containing ozone can be used directly. In other cases, in particular ozone generation and polysulfide formation, where the oxidizing effect of ozone is too strong, the residual ozone should be destroyed.

When the residual ozone is to be destroyed, this can be achieved in known ozone destruction units in which the ozone is converted to oxygen. One such destruction unit involves passing the vent gas containing residual ozone through a catalytic bed of alumina doped with manganese oxide and cupric oxide; another known destruction unit comprises a tube housing an electric heating element, and the vent gas containing ozone is fed along the tube.

Figure 1:
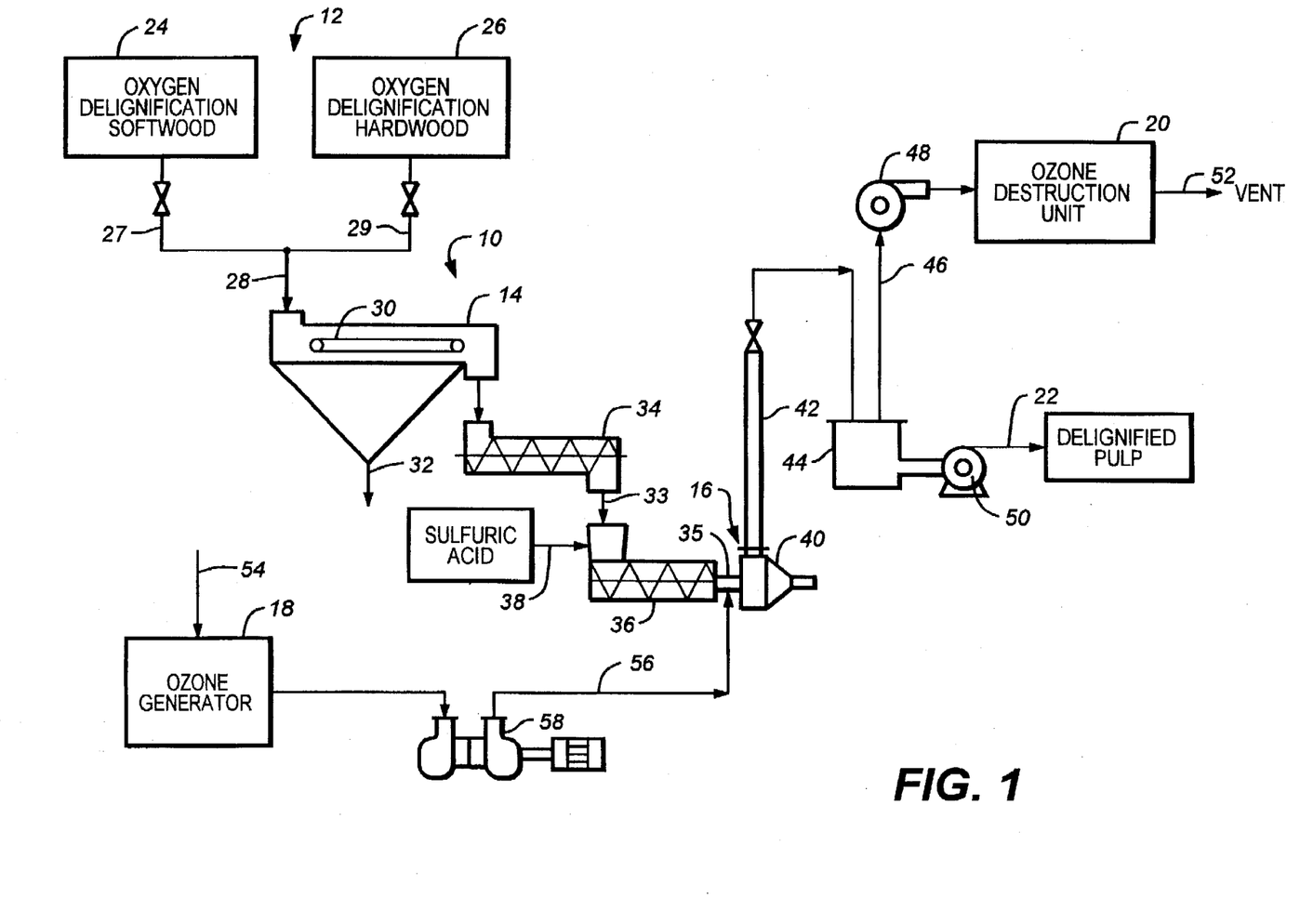
FIG. 1 is a schematic representation of an installation at a pulp site for ozone bleaching of pulp, and recovery of an oxygen-rich gas.

With further reference to FIG. 1, installation 10 includes a source of oxygen-delignified pulp 12, a washer 14, a bleaching unit 16, an ozone generator 18, an ozone destruction unit 20 and a bleached pulp line 22.

The source 12 as shown includes a source 24 of oxygen-delignified softwood pulp and a source 26 of oxygen-delignified hardwood pulp. Feed line 28 communicates source 12 with washer 14. The feed line 28 has branch lines 27 and 29 communicating with the sources 24 and 26, respectively, and lines 27 and 29 are valve-controlled so that a feed of softwood pulp only, or of hardwood pulp only, or a mixture of the pulps, is fed along feed line 28.

Washer 14 includes a conveyor belt 30 and an outlet 32 for washings. A screw conveyor 34 communicates with an outlet end of conveyor belt 30 in washer 14, and a downstream end of screw conveyor 34 communicates with a medium consistency pump 36 via a pulp line 33. Acid line 38 communicates with pulp line 33. Pulp conduit 35 communicates pump 36 with bleaching unit 16. Bleaching unit 16 includes a pulp mixer 40, for example a high shear mixer, and a retention tube 42.

The retention tube 42 communicates with a vent gas tank 44 which has a vent line 46. Bleach pulp line 22 also communicates with vent gas tank 44.

A vent gas blower 48 is disposed in vent line 46, and a pump 50 is disposed in bleached pulp line 22. An oxygen outlet line 52 for oxygen-rich gas communicates with oxygen destruction unit 20. Ozone generator 18 includes an oxygen inlet 54 and a pressurized ozone line 56. A compressor 58 is disposed in line 56.

Figure 2:
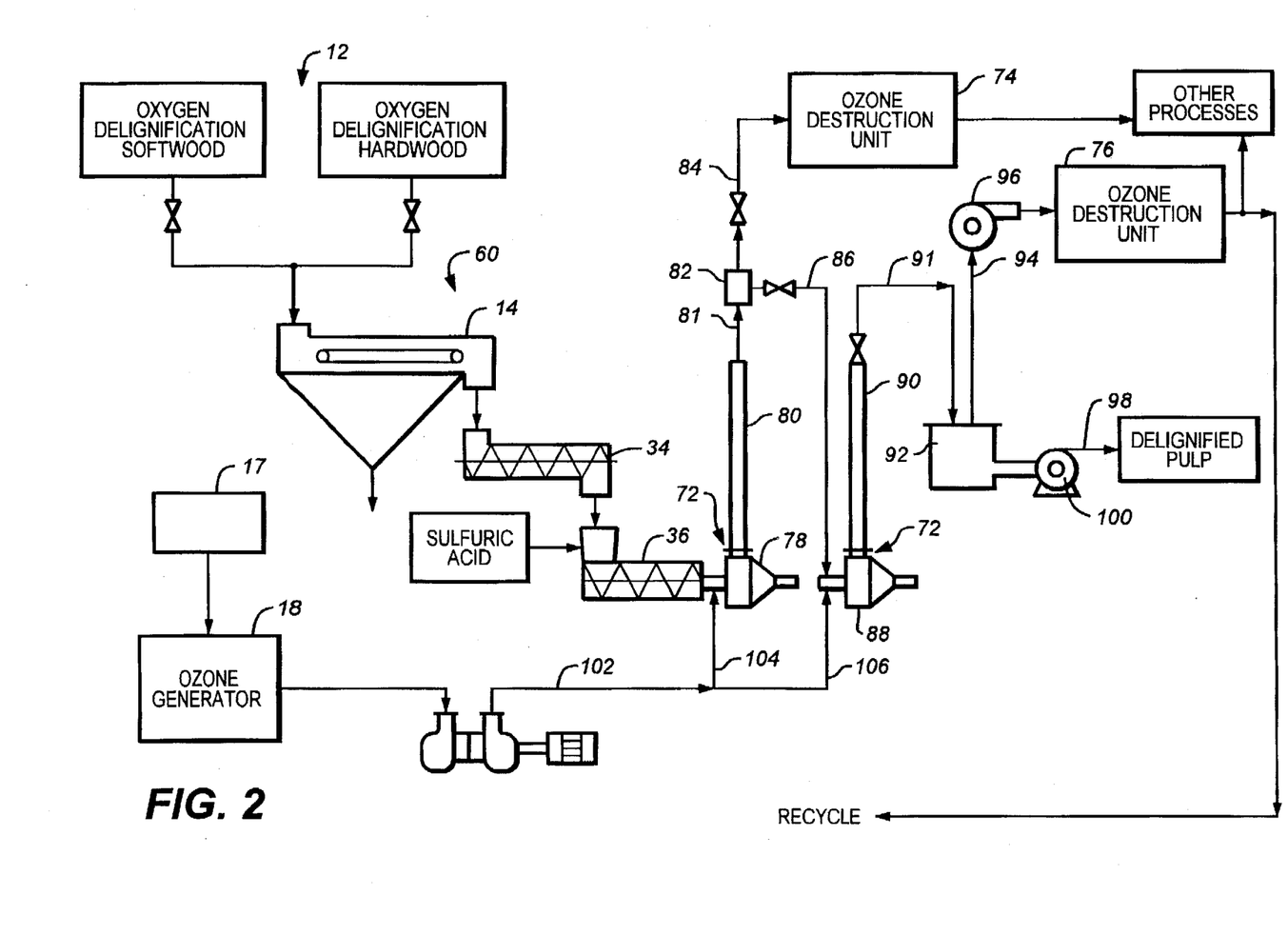
FIG. 2 is a schematic or the preferred embodiment showing a plurality of bleaching units and recovery of gas.

With further reference to FIG. 2, there is shown a preferred installation 60 which comprises the same major components as installation 10 of FIG. 1. Insofar as common units are employed in installation 60 and installation 10, the same element numbers are used in FIG. 2.

Installation 60 includes a plurality of bleaching units. More especially, installation 60 includes an upstream bleaching unit 70 and a downstream bleaching unit 72. Upstream bleaching unit 70 preferably comprises an ozone destruction unit 74, and downstream bleaching unit 72 preferably comprises an ozone destruction unit 76.

Bleaching unit 70 includes a pulp mixer 78 and a retention tube 80. A pulp outlet line 81 communicates retention tube 80 with vent gas tank 82. A vent line 84 communicates vent gas tank 82 with ozone destruction unit 74. A pulp line 86 communicates vent gas tank 82 with a pulp mixer 88 of the downstream bleaching unit 72.

Downstream bleaching unit 72 includes the aforementioned pulp mixer 88 and a retention tube 90. A pulp outlet line 91 communicates retention tube 90 with a vent gas tank 92. A vent line 94 communicates vent gas tank 92 with ozone destruction unit 76; a pump 96 is disposed in vent line 94. Bleached pulp line 98 communicates with vent gas tank 92, and a pump 100 is disposed in line 98.

Generally, the purity of the oxygen entering the system from an oxygen source 17 is a function of the required purity of gas for the other mill processes utilizing oxygen-containing gas and the amount of entrained gases in the lignocellulosic pulp.

Although the oxygen in the feed mixture may be the product of a cryogenic air separation process or derived from a tank containing industrial grade purity oxygen in bulk, in certain embodiments, the oxygen source 17 is an absorption unit, either VSA, PSA, or VPSA, where the product oxygen purity is less than other oxygen production processes such as with a cryogenic production process. Further, a radial design VSA system may be preferred, of the type described for example in U.S. Pat. No. 4,541,851, issued Sep. 17, 1985 to Busquain et al.; or U.S. Pat. No.

5,232,479, issued Aug. 3, 1993 to Poteau et al., which are incorporated by reference herein.

The ozone generator 18 in FIG. 2 has an ozone line 102 with ozone branch lines 104 and 106. Ozone branch line 104 feeds ozone to upstream bleaching unit 70, and ozone branch line 106 feeds ozone to downstream bleaching unit 72. In the preferred embodiments, the ratio of ozone to pulp in the upstream bleaching unit 70 is controlled to be less than, preferably between about thirty and about seventy percent, most preferably about half of the ratio of ozone to pulp in the downstream bleaching unit 72.

In certain embodiments, an oxygen-containing liquid, preferably hydrogen peroxide, may be added to the first stage mixer, or the downstream mixers, or both.

The process of the invention is further described with reference to the installation 10 illustrated in FIG. 1.

A medium consistency oxygen-delignified pulp is fed from source 12 along feed line 28 to washer 14. The pulp is washed in washer 14 to remove solubilized lignin developed during the oxygen delignification. In the case of a hardwood pulp from source 26, the washing is typically carried out to achieve a kappa number of about 9 to 11, and in the case of a softwood pulp from source 24, the washing is typically carried out to achieve a kappa number of 11 to 13. In washer 14 the pulp is carried on conveyor belt 30 and is typically subjected to a spray of water, which water passes through the belt taking with it solubilized lignin which is removed by washings through outlet 32.

The washed medium consistency pulp is then conveyed from washer 14 by screw conveyor 34 and fed through pulp line 33 into medium consistency pump 36. Acid is introduced through line 38 into pulp line 33 to acidify the pulp, typically to a Ph of 2 to 4.

Ozone is generated from oxygen in ozone generator 18 and is delivered as a mixture of ozone and oxygen, under a pressure typically of about 12 atmospheres, along line 56 to pulp conduit 35, and thence into pulp mixer 40.

In pulp mixer 40, the aqueous pulp and the ozone are agitated to disperse ozone in the aqueous vehicle of the pulp.

In the continuous process illustrated in FIG. 1, the aqueous pulp having ozone dispersed in the aqueous vehicle exits mixer 40 and flows through retention tube 42, which is elongate and allows a contact time between the dispersed ozone and the cellulosic material of the aqueous pulp to permit consumption of the ozone in the bleaching of the pulp.

The bleached pulp from retention tube 42 flows from retention tube 42 to vent gas tank 44. Vent gases exit vent gas tank 44 through vent line 46 and are pumped by blower 48 into ozone destruction unit 20. Residual ozone is destroyed, particularly by conversion to oxygen in unit 20. The bleached pulp is pumped from vent gas tank 44 along line 22 by pump 50 and, from there, passes to the appropriate paper-making operation.

The process is preferably carried out so that entry of air into bleaching unit 16 is avoided by appropriate sealing of the unit. Furthermore, in the preferred embodiment, the pulp entering mixer 40 is subjected to vacuum degassing prior to entry of the ozone, to reduce the content of air and other gases which may be present as a result of the preliminary steps carried out on the pulp. These gases include air entrained in the oxygen delignification or in the washing steps and carbon dioxide generated from sodium carbonate in the pulp by the addition of acid at line 38.

In this way, the presence of gases other than oxygen from the oxygen ozone mix, and oxygen produced as a by-product from the ozone, are minimized in the vent gases, and an oxygen-rich vent gas is produced and can be delivered directly from line 52 to an installation having an oxygen requirement, after the residual ozone is converted to oxygen in oxygen destruction unit 20.

The oxygen-rich vent gas in line 52 can be further purified, if required, depending on the area of use to which the gas is to be put. For example, if the gas is to be recycled to the ozone generator 18 to manufacture an ozone containing oxygen gas, it is appropriate to dry the gas to remove water which interferes with ozone generation.

The pretreatment of the pulp is essentially as described for FIG. 1.

The ozone/oxygen mixture is introduced through branch line 104 into the aqueous pulp entering pulp mixer 78, and the ozone is dispersed in the aqueous vehicle of the pulp as described in connection with FIG. 1. The ozone is then allowed to react with the cellulosic material in the aqueous pulp in retention tube 80, and a bleached pulp, together with oxygen and other gases, flows from retention tube 80 along pulp outlet line 81 into vent gas tank 82. Vent gases in vent gas tank 82 flow along vent line 84 to ozone destruction unit 74 in which the residual, unused ozone is converted to oxygen. Bleached aqueous pulp flows from vent gas tank 82 along pulp line 86 to pulp mixer 88, and ozone is introduced into this aqueous pulp through branch line 106. The ozone is dispersed in the aqueous vehicle of the aqueous pulp in mixer 88 as described for mixer 40 in FIG. 1. The aqueous pulp then flows into retention tube 90, which allows for reaction between the ozone and the pulp to effect further bleaching of the pulp, and a bleached pulp and residual gases flow from retention tube 90 along pulp outlet line 91 to vent gas tank 92. Vent gases in vent gas tank 92 are pumped by pump 96 along vent line 94 to ozone destruction unit 76. Bleached aqueous pulp in vent gas tank 92 is pumped by pump 100 along bleached pulp line 98 and thereafter passes to a paper-making process.

In this embodiment, even if the entrained air and other gases are not removed from the aqueous pulp prior to the upstream bleaching unit 70, most of such gases will exit in the vent gas stream in vent line 84. In such case, provided downstream bleaching unit 72 is sealed to prevent ingress of air, the vent gas recovered from ozone destruction unit 76 will be of high oxygen content and will be ready for use in most oxygen requiring processes. Such gas will, however, need to be dried if it is to be employed for ozone generation in ozone generator 18.

Similarly, if the installation 16 includes additional bleaching units of the form of 70 and 72, all of the downstream units will produce an oxygen-rich gas directly, provided the units are adequately sealed to prevent ingress of air, since the air entrained in the pulp, and other gases formed in the pulp in the preliminary stages, will essentially form part of the vent gas from the first upstream bleaching unit 70.

Consequently, by using an installation 60 with a plurality of bleaching units, it is possible to form an oxygen-rich gas which requires no post-treatment for many purposes, from the downstream bleaching units. In such case, the only post-treatment necessary would be removal of water, if the oxygen were to be cycled to the ozone generator 18. For other process uses, removal of water would not be required, and the oxygen-rich gas could be fed directly to the oxygen-consuming process.

EXAMPLES

Example 1 (Comparison)

A process was carried out in accordance with the invention, following the procedure described in conjunction with FIG. 1.

In a first operation no attempt was made to seal the bleaching unit 16 against ingress of air, and no steps were taken to remove gases entrained in the pulp in the preliminary stages.

An analysis of the vent gases in line 84, prior to the ozone destruction unit 74, revealed a gas mixture of the following composition:

| Oxygen | 42.0–54.0% V/V |
| --- | --- |
| Carbon Dioxide | 0.7–1.4% V/V |
| Hydrocarbons | 10–15 ppm |
| Residual Ozone | 0.01–1.0% W/W |
| Argon and Nitrogen | Balance |

At first, the balance of gases, mainly argon and nitrogen, was thought to be due to air entrapped in the pulp in the preliminary stages. However, on further investigation it was found to be due mainly to air leaking into the vent gases.

Example 2

The procedure of Example 1 was repeated, but the bleaching unit 16 was sealed, and air leaks eliminated. The oxygen content increased, and the argon and nitrogen contents decreased correspondingly. A typical analysis before the ozone destruction unit was found to be:

| Oxygen | 90–95% V/V |
| --- | --- |
| Carbon Dioxide | 1–3% V/V |
| Hydrocarbons | 20–80 ppm |
| Residual Ozone | 0.01–1.6% W/W |
| Argon and Nitrogen | Balance |

When the gas analysis was taken after the ozone destruction, the residual ozone fell to the range of 0.001 ppm, and the gas composition was as follows:

| Oxygen | 90–95% V/V |
| --- | --- |
| Carbon Dioxide | 1–3% V/V |
| Hydrocarbons | 20–80 ppm |
| Residual Ozone | 0.001 ppm |
| Argon and Nitrogen | Balance |

It was expected that in the ozone bleaching the vent gases would contain a concentration of carbon dioxide and carbon monoxide similar to that measured in the vent gases from an Oxygen Delignification Process. However, it was found that their compositions were quite different than expected as can be seen from Table III:

TABLE III

Comparison of Carbon Dioxide and Carbon Monoxide concentration in Vent Gases from Ozone Bleaching and Oxygen Delignification Processes

| Process | $CO_2$ % V/V | CO as $CH_4$ ppm |
| --- | --- | --- |
| Ozone Bleaching | 1–3 | 20–80 |
| Oxygen Delignification | 0.1–10% | 3,000–15,000 |

Example 3

The procedure described with reference to FIG. 2 was followed.

In this example medium consistency pulp from the washers of an Oxygen Delignification Process was pumped into the pulp mixer 78 operating at a pressure of 150 psig. Here, a gas mixture containing 6% w/w of ozone in oxygen was pumped into the pulp mixer 78, where it was dispersed in the aqueous pulp. From the mixer 78, the gas-pulp mixture flowed into the retention tube 80, where it resided for about 60 seconds to allow the ozone to be absorbed and react with the cellulosic material.

The oxygen which does not react and residual unreacted ozone were then vented and the pulp flowed into the second mixer 88. Here, more ozone was added to the pulp and dispersed. The gas-pulp mixture then passed into a retention tube 90, where the ozone was consumed and the excess gases vented.

Hence, in this process there are two sources of vent gas. The composition of the vent gases of the two sources is different because in the upstream mixer 78 stripping of the gases in the pulp, mainly air and carbon dioxide, is substantially complete, so that the gases vented after the downstream mixer 88 contain substantially no air or carbon dioxide. The composition of the vent gases from the two stages of mixing are shown in Tables IV and V.

| Process Conditions | |
| --- | --- |
| Ozone concentration | 6% w/w in $O_2$ gas |
| Pressure at Pulp/Gas Mixer | 150 psig |
| Temperature Pulp | 35° C. |
| Consistency | 8–12% |
| Type Pulp | Hardwood |
| Ph | 2–4 |

TABLE IV

Vent gas composition from Stage 1 Mixer after addition of 0.5% ozone charge on pulp.

| | Gas Composition | | | | |
| --- | --- | --- | --- | --- | --- |
| Process Steps | $O_2$ % V/V | Ar + $N_2$ % V/V | $CO_2$ % V/V | H/C ppm | $O_3$ % W/W |
| Without degassing | 91.0 | 5.9 | 1.9 | 40 | 1.1% W/W |
| With degassing | 94.4 | 3.4 | 0.8 | 40 | 0.2% W/W |
| After $O_3$ Destruct | 95.8 | 3.4 | 0.8 | 40 | 0.001 ppm |
| After removal Hydrocarbon | 95.8 | 3.4 | 0.8 | 0 | 0.001 ppm |
| After removal $CO_2$ | 96.6 | 3.4 | 0 | 0 | 0.001 ppm |

Table IV shows that the vent gas leaving the first stage mixer, and after passing through the ozone destruction system, contains a high concentration of oxygen. This gas, without ozone destruction, could be directly used in other processes requiring oxygen such as:

Oxygen Delignification
White Liquor Oxidation
Black Liquor Oxidation
Lime Kiln Enrichment
Oxygen Extraction
Lime Mud Oxidation This gas, after ozone destruction, could be used in:
Polysulfide Formation for White Liquor
Ozone Generation Table V shows that the vent gas composition leaving the second stage mixer contains a high concentration of oxygen, and after passing through the ozone destruction system and a dryer, it could be recycled back to the ozone generator 18 or used in another process where oxygen is required.

TABLE V

Vent gas composition from Stage II Mixer after addition of 0.5% ozone charge on pulp.

| Process Steps | Gas Composition | | | | |
|---|---|---|---|---|---|
| | $O_2$ % V/V | Ar + $N_2$ % V/V | $CO_2$ % V/V | H/C ppm | $O_3$ % W/W |
| Without degassing | 98.2 | 0.6 | 1.0 | 20 | 1.1% W/W |
| With degassing | — | — | — | — | — |
| After $O_3$ Destruct | 99.3 | 0.6 | 0.1 | 20 | 0.001 ppm |
| After removal Hydrocarbon | 99.3 | 0.6 | 0.1 | 0 | 0.001 ppm |
| After removal $CO_2$ | 99.4 | 0.6 | 0 | 0 | 0.001 ppm |

What is claimed is:

1. A method of bleaching lignocellulosic pulp, comprising:
    a) generating ozone from oxygen in an oxygen-containing feed gas;
    b) contacting at least a portion of lignocellulosic pulp with a mixture comprising oxygen and ozone in a first contactor to produce a treated pulp and a first effluent gas, said first effluent gas being suitable for conducting a secondary process wherein a presence of elevated amounts of gases other than ozone and oxygen is tolerated;
    c) transferring at least a portion of said treated pulp to a second contactor, and further treating said pulp portion with a mixture comprising oxygen and ozone, to produce a further treated pulp and a second effluent gas;
    d) recovering a bleach pulp;
    e) recovering said second effluent gas, said second effluent gas being oxygen-rich and being suitable for recycling for ozone generation; and
    f) monitoring both the first and second effluent gases and adjusting the properties of the mixtures comprising oxygen and ozone based upon the monitoring of the first and second effluent gases.

2. The method as recited in claim 1 wherein the lignocellulosic pulp comprises one or more pulps selected from the group consisting of medium consistency pulp having a Kappa number of 8 to 15, oxygen delignified Kraft pulp, chemical sulfite pulp, and pulp of recycled fibers.

3. The method as recited in claim 1, wherein the mixture comprising oxygen and ozone used in the first and second contactors comprises between about 85 percent and about 95 percent by weight oxygen and between about 5 percent and about 15 percent by weight ozone.

4. The method as recited in claim 1, wherein the oxygen-rich gas recovered as the second effluent comprises greater than about 90 percent by weight oxygen.

5. The method as recited in claim 1, further comprising recycling at least a portion of the recovered second effluent oxygen-rich gas.

6. The method as recited in claim 1 wherein the ratio of ozone to pulp in the first contactor is less than the ratio of ozone to pulp in the second contactor.

7. The method as recited in claim 6, wherein the ratio of ozone to pulp in the first contactor is between about 30 percent and about 70 percent of the ratio of ozone to pulp in the second contactor.

8. The method as recited in claim 6, wherein the ratio of ozone to pulp in the first contactor is about 50 percent of the ratio of ozone to pulp in the second contactor.

9. The method as recited in claim 1 further comprising producing an oxygen enriched gas mixture having an oxygen concentration of less than about 95% before generation of ozone in the produced gas mixture in an ozone generator and feeding the ozone containing gas mixture to at least one of the pulp contactors.

10. The method as recited in claim 9, wherein the oxygen mixture is a product of a pressure swing or vacuum swing absorption unit, a cryogenic process or is derived from a tank containing bulk industrial grade oxygen.

11. The method as recited in claim 10, wherein the oxygen in the feed to the ozone generator is from a vacuum swing absorption process and the oxygen concentration in the feed to the ozone generator is less than about 95% by weight.

12. The method as recited in claim 1, which further comprises, after treating said lignocellulosic pulp in said first contactor in step b), deaerating entrained air in the pulp and degassing gases produced from said treatment prior to further treating said pulp in step c).

13. The method as recited in claim 1 wherein the mixture in at least one of the contactors comprises hydrogen peroxide.

14. The method as recited in claim 5, wherein the recycled oxygen-rich gas is recycled to the ozone generator.

15. The method as recited in claim 14, wherein the ingress of air into at least the second contactor is prevented.

* * * * *